(12) United States Patent
Lennen

(10) Patent No.: US 10,197,680 B2
(45) Date of Patent: Feb. 5, 2019

(54) GNSS RECEIVER

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 523 days.

(21) Appl. No.: 14/827,780

(22) Filed: Aug. 17, 2015

(65) Prior Publication Data
US 2016/0054450 A1 Feb. 25, 2016

Related U.S. Application Data

(60) Provisional application No. 62/037,940, filed on Aug. 15, 2014.

(51) Int. Cl.
*G01S 19/33* (2010.01)
*G01S 19/46* (2010.01)

(52) U.S. Cl.
CPC .............. *G01S 19/33* (2013.01); *G01S 19/46* (2013.01)

(58) Field of Classification Search
CPC ................................ G01S 19/33; G01S 19/46
USPC ........................................ 342/357.73, 357.29
See application file for complete search history.

(56) References Cited

U.S. PATENT DOCUMENTS

| | | | |
|---|---|---|---|
| 6,563,765 B1 * | 5/2003 | Ishikagi ................. | G04R 20/04 368/47 |
| 6,731,701 B2 | 5/2004 | Vorobiev et al. | |
| 7,932,856 B2 * | 4/2011 | Baba ....................... | G01S 19/19 342/357.25 |
| 8,009,519 B2 * | 8/2011 | Jarza et al. ............. | G01S 19/25 368/47 |
| 8,077,086 B2 | 12/2011 | Huang et al. | |
| 8,400,354 B2 | 3/2013 | Abraham | |
| 8,514,667 B2 * | 8/2013 | Akiyama ............... | G04R 20/06 368/47 |
| 8,525,726 B2 | 9/2013 | Diggelen et al. | |
| 8,593,342 B2 | 11/2013 | Chansarkar et al. | |
| 9,448,539 B2 * | 9/2016 | Akiyama ............... | G04R 20/02 |
| 2002/0129290 A1 * | 9/2002 | Couillard ................. | G06F 1/14 713/400 |
| 2009/0129206 A1 * | 5/2009 | Baba ....................... | G01S 19/34 368/14 |

(Continued)

FOREIGN PATENT DOCUMENTS

WO WO 2010-075647 7/2010

OTHER PUBLICATIONS

Jacek Januszewski, The Problem of Compatibility and Interoperability of Satellite Navigation Systems in Computation of User's Position.

(Continued)

*Primary Examiner* — Chuong P Nguyen
(74) *Attorney, Agent, or Firm* — The Farrell Law Firm, P.C.

(57) ABSTRACT

A method for use with a Global Navigation Satellite System (GNSS) receiver is provided. The method includes obtaining a first system time from a satellite of a first satellite navigation system, obtaining a second system time from a satellite of a second satellite navigation system, calculating a difference between the first system time and the second system time to obtain a number of leap seconds between Coordinated Universal Time (UTC) and the second satellite system.

18 Claims, 4 Drawing Sheets

(56) References Cited

U.S. PATENT DOCUMENTS

| | | |
|---|---|---|
| 2011/0102260 A1 | 5/2011 | Morrison |
| 2012/0188854 A1 | 7/2012 | Baba |
| 2012/0243383 A1 | 9/2012 | Honda |
| 2012/0294112 A1 | 11/2012 | Pearce et al. |
| 2014/0028498 A1* | 1/2014 | Lin .................. G01S 19/33 342/357.63 |
| 2016/0025859 A1* | 1/2016 | Basnayake ............ G04R 20/06 342/357.62 |
| 2016/0026157 A1* | 1/2016 | Baba .................. G01S 19/33 368/47 |
| 2016/0308984 A1* | 10/2016 | Gottumukkala et al. ................. H04L 67/18 |
| 2017/0205511 A1* | 7/2017 | Lin .................. G01S 19/33 |
| 2018/0088243 A1* | 3/2018 | Wang et al. ............ G01S 19/33 |

OTHER PUBLICATIONS

Artificial Satellites, vol. 46, No. 3—2011 DOI: 10.2478/v10018-012-0001-2.

\* cited by examiner

GNSS RECEIVER

PRIORITY

This application claims priority under 35 U.S.C. § 119(e) to U.S. Provisional Patent Application Ser. No. 62/037,940, which was filed on Aug. 15, 2014, the entire disclosure of which is incorporated herein by reference.

BACKGROUND

1. Field of the Invention

The present disclosure relates generally to a Global Navigation Satellite System (GNSS) receiver, and more particularly, to a GNSS receiver that is configured to calculate a leap second offset for system time compatibility between individual GNSS systems.

2. Description of the Related Art

Currently, GPS, Galileo, Beidou, etc. each use a system time definition that is continuous and as such does not jump time by one (1) second during leap second updates to Coordinated Universal Time (UTC). The current offset between GPS and Galileo system times and UTC is sixteen (16) seconds, and a current offset between Beidou system time and UTC is two (2) seconds. For example, when it is midnight, GPS time is 11:59:44 pm UTC. The Glonass system maintains its system time in step with UTC Moscow and as such Glonass system time leaps by a second during each UTC leap second update.

However, a problem occurs when combining GPS, Galileo or Beidou satellites with Glonass satellites when the current UTC leap second offset is not known; this is the case during GNSS receiver factory reset, cold starts and some other potential use cases (e.g. Spirent GNSS simulator use).

The problem is currently solved by waiting until the GPS (or other GNSS system) transmits the offset between GPS time and UTC, in the case of GPS this can take up to 12.5 minutes. It is noted that Glonass satellites do not transmit differences between GPS and UTC times.

The impact of not knowing the leap second offset in some cases is that Glonass measurements cannot be combined with other GNSS systems measurements until leap second offset is known, which may significantly slow down the Time To First Fix (TTFF) in these cases.

SUMMARY

The present disclosure has been made to address the above problems and disadvantages, and to provide at least the advantages described below.

Accordingly, an aspect of the present invention, which may prove useful in the related arts, provides a GNSS receiver that is configured for measuring a time difference between GPS (or Beidou or Galileo) data frames and Glonass data frames to allow the GNSS receiver to discern a Glonass UTC system time offset with respect to other GNSS systems, which, in turn, allows for rapid use of a combined navigation solution using Glonass and other GNSS systems.

In accordance with an aspect of the present disclosure, there is provided a method for satellite communication using a GNSS receiver. The method includes obtaining a first system time from a satellite of a first satellite navigation system, obtaining a second system time from a satellite of a second satellite navigation system, calculating a difference between the first system time and the second system time to obtain a number of leap seconds between UTC and the second satellite system.

In accordance with an aspect of the present disclosure, there is provided a GNSS receiver. The GNSS receiver includes memory configured to store a first system time obtained from a satellite of a first satellite navigation system and a second system time obtained from a satellite of a second satellite navigation system and a microcontroller coupled to the memory and configured to calculate a difference between the first system time and the second system time for obtaining a number of leap seconds between UTC.

In accordance with an aspect of the present disclosure, there is provided a System on Chip (SoC) having at least one module thereon that in response to being executed by at least one microcontroller in a GNSS receiver enable the GNSS receiver to perform the method including obtaining a first system time from a satellite of a first satellite navigation system, obtaining a second system time from a satellite of a second satellite navigation system, and calculating a difference between the first system time and the second system time to obtain a number of leap seconds between UTC and the second satellite system.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Various embodiments of the present invention will now be described in detail with reference to the accompanying drawings. In the following description, specific details such as detailed configuration and components are merely provided to assist in the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In accordance with the present disclosure, a GNSS receiver and/or like enabled device obtains first and second GNSS time information from satellites associated with a corresponding GNSS and calculates a difference between the obtained first system time and the obtained second system time to obtain a number of leap seconds between UTC and the second satellite system.

Figure 1:
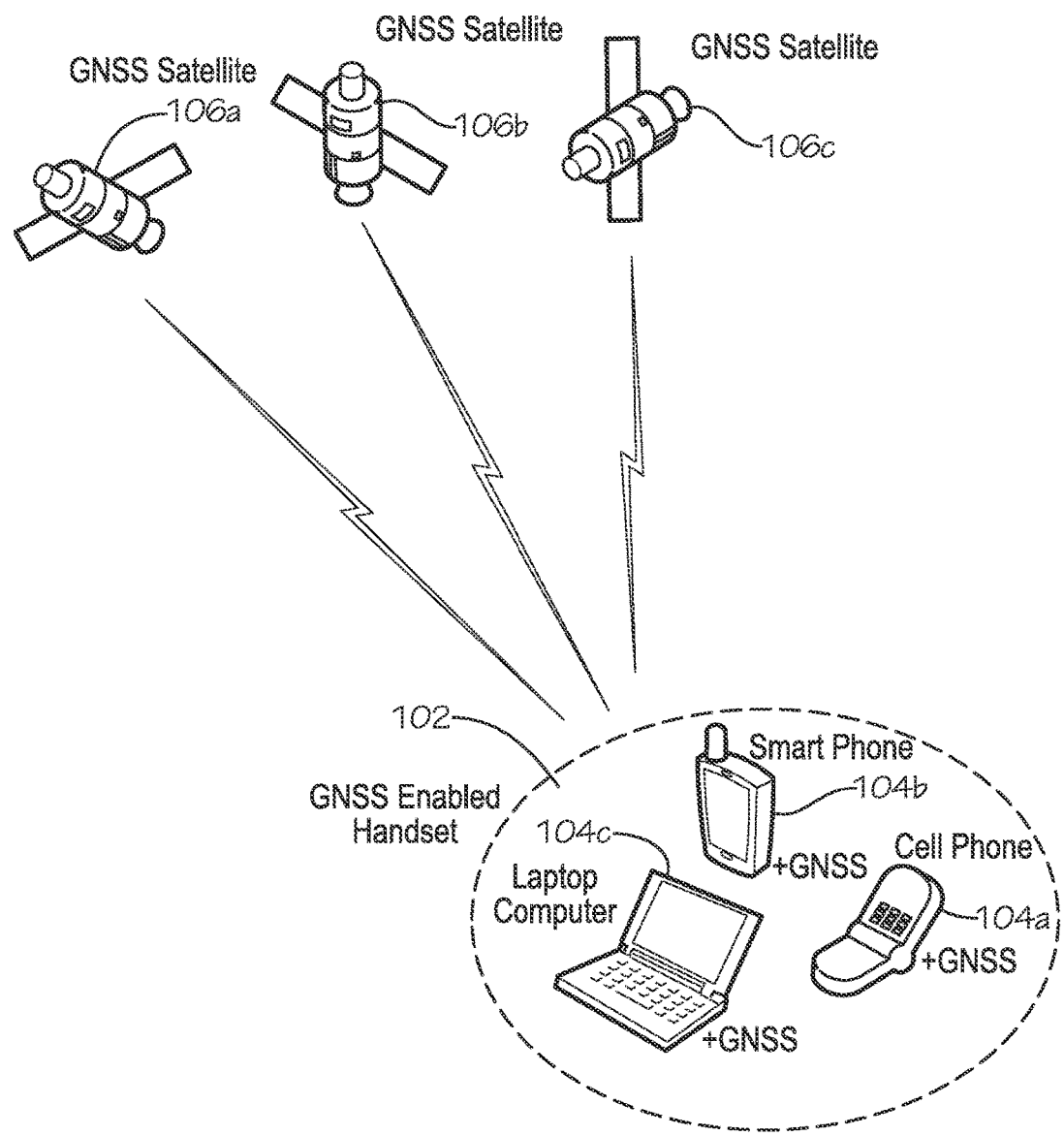
FIG. 1 is a diagram illustrating a GNSS receiver that is configured to communicate with one or more satellites associated with one or more corresponding GNSSs, according to an embodiment of the present disclosure.

FIG. 1 is a diagram illustrating a GNSS receiver 102 that is configured to communicate with one or more satellites 106a-106c associated with one or more corresponding GNSSs, according to an embodiment of the present disclosure.

The GNSS receiver 102 may be embodied in the form of one or more GNSS enabled devices, e.g., a GNSS enabled cellular phone 104a, a GNSS enabled smartphone 104b, a GNSS enabled laptop or personal digital assistant 104c, a portable computing device, a navigation unit, an access point (e.g., a base station) or other wireless communication device, or any combination thereof.

Figure 2:
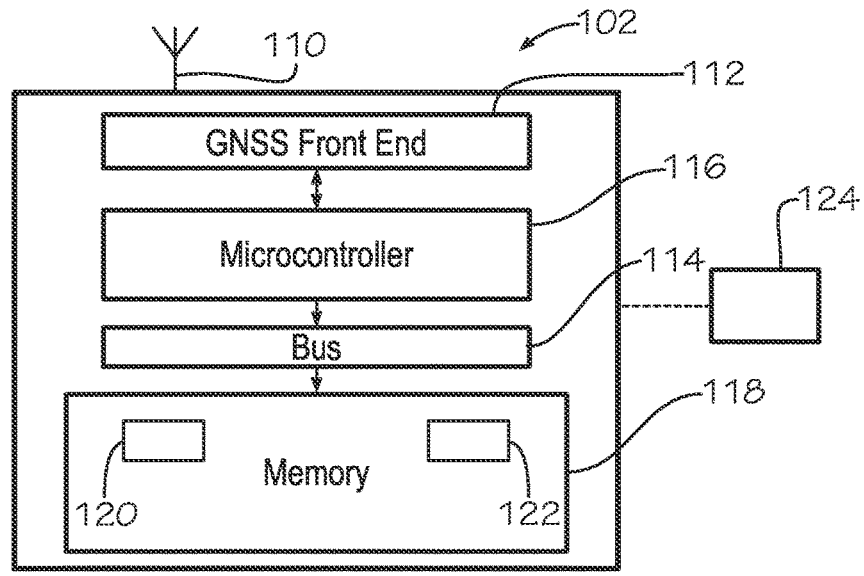
FIG. 2 is a diagram illustrating components of the GNSS receiver, according to an embodiment of the present disclosure.

FIG. 2 is a diagram illustrating components of the GNSS receiver 102, in accordance with an embodiment of the invention.

The GNSS receiver 102 includes one or more antennas 110, a GNSS front end 112, one or more connections 114, a processor or microcontroller 116, and a memory 118.

The antenna 110 includes suitable logic, circuitry and/or code that may be enabled to receive various signals from the plurality of GNSS satellites 106a-106c. The antenna 110 may enable transmission and/or reception of radio signals via, for example, one or more suitable radio communication system.

The GNSS front end 112 includes suitable logic, circuitry and/or code that may be enabled to receive GNSS satellite broadcast signals via the antenna 110. The GNSS front end 112 generates one or more electronic signals representing one or more GNSS signals received from the antenna 110 and transmits the generated electronic signals via the one or more connects 114 (e.g., buses, lines, conductors, fibers, etc.), which couple together the various circuits of the GNSS receiver 102 and carry one or more electronic signals therebetween, to the microcontroller 116.

The microcontroller 116 includes suitable logic, circuitry and/or code that may be enabled to process received satellite signals. The microcontroller 116 receives one or more electronic signals from RF front-end circuit 112 to establish various navigation information, such as orbital information, e.g., broadcast ephemeris or ephemeris data. The broadcast ephemeris may be utilized by the microcontroller 116 to determine a navigation solution such as, for example, position fix, velocity, clock information of the GNSS receiver 102, first and second time information, 120, 122, respectively, that may be associated with one or more corresponding GNSSs, etc., and stores this information in a memory 118.

The memory 118 includes suitable logic, circuitry, and/or code that may enable storing of information such as executable instructions that may be executed, for example, by the microcontroller 116, and data that may be utilized by the microcontroller 116. The executable instructions may include algorithms that may be applied to extract ephemeris from received GNSS broadcast navigation signals, to calculate a navigation solution from the extracted ephemeris and to calculate a difference between a first system time and a second system time for obtaining a number of leap seconds between UTC and a satellite system, as will be described in greater detail below.

The memory 118 may include a primary memory including a random access memory, read only memory, low latency nonvolatile memory such as flash memory and/or other suitable electronic data storage. While illustrated as being separate from the microcontroller 116, at least a portion of the primary memory may be provided within or otherwise co-located/coupled with the microcontroller 116 or other module of the GNSS receiver 102.

The memory 116 may also include a secondary memory, which may be the same or similar type of memory as primary memory and/or one or more data storage devices or systems, such as, for example, a disk drive, an optical disc drive, a tape drive, a solid state memory drive, etc. The secondary memory may be operatively receptive of, or otherwise configurable to couple to, a non-transitory computer readable medium 124.

The components described with reference to FIG. 2 allow the GNSS receiver 102 to provide improved speed in combining Glonass satellites with other GNSSs under certain circumstances, regardless if a number of leap seconds between UTC and GPS (or Galileo or Beidou) is known, or uncertain. The GNSS receiver 102 may include one or more other components such as modulators/demodulators, additional antennas, memory, etc.

Figure 3:
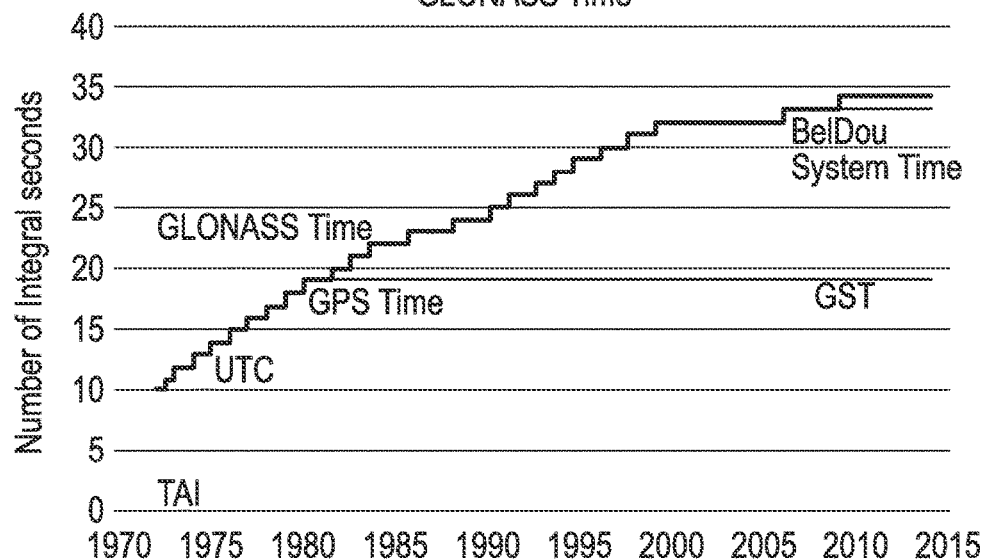
FIG. 3 is a graph illustrating a relationship between different time scales associated with various GNSSs, according to an embodiment of the present disclosure.

FIG. 3 is a graph illustrating a relationship between different time scales associated with various GNSSs, according to an embodiment of the present disclosure.

As illustrated in FIG. 3, the Glonass system time is in step with UTC, and the GPS system time and Galileo system time are in step with each other. Beidou system time, which started in Jan. 1, 2006, is offset from the UTC/Glonass system time by 2 seconds and there is a 14 second fixed system offset between the GPS/Galileo system time and the Beidou system time; this offset will be maintained through future leap second adjustments.

The GNSS receiver 102 uses this offset time information to measure/calculate a number of leap seconds between UTC/Glonass and the other GNSSs. The measurement/calculation requires at least one Glonass signal track, as Glonass is in step with UTC, and one other signal track (e.g., from one of GPS, Galileo or Beidou). For illustrative purposes, it is assumed that the one other signal track is obtained from the GPS.

Figure 4:
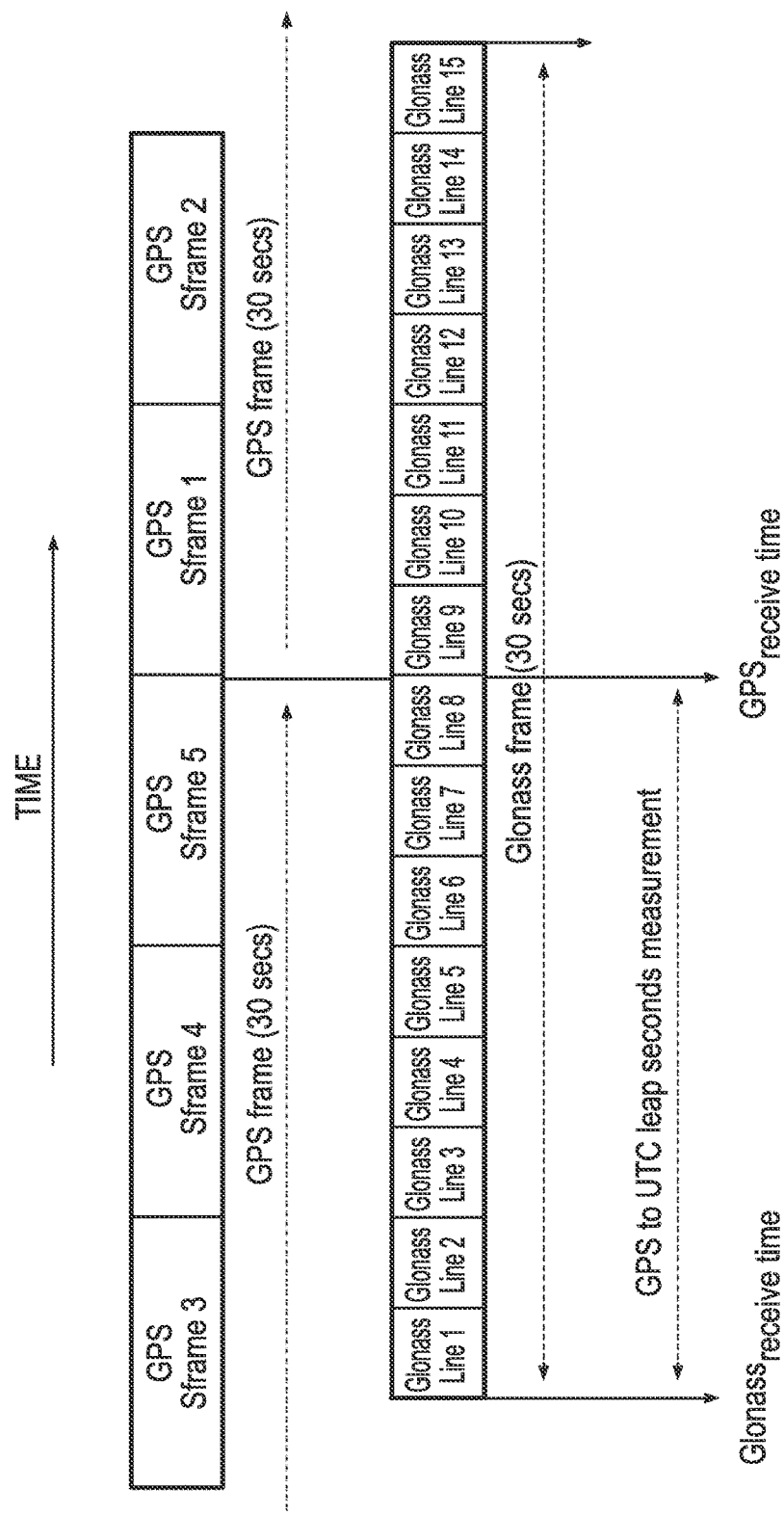
FIG. 4 is a diagram illustrating a time relationship between GPS frames and Glonass frames, according to an embodiment of the present disclosure.

The GPS satellite 106b transmits Week Number and Time of Week in each subframe (FIG. 4), with the combination of these allowing the GNSS receiver 102 to acquire system time information of the GPS, with respect to every received GPS subframe and frame. The GPS system time information is available to the GNSS receiver 102 every 6 seconds. Similarly, the Glonass satellite 106a transmits system time information of the Glonass System time in each 30 second frame (FIG. 4) via a Glonass day number and number of seconds of frame transmission within a current Glonass day number. The GNSS receiver 102 uses these known variables to calculate a number of leap seconds between UTC/Glonass and the other GNSSs.

Figure 5:
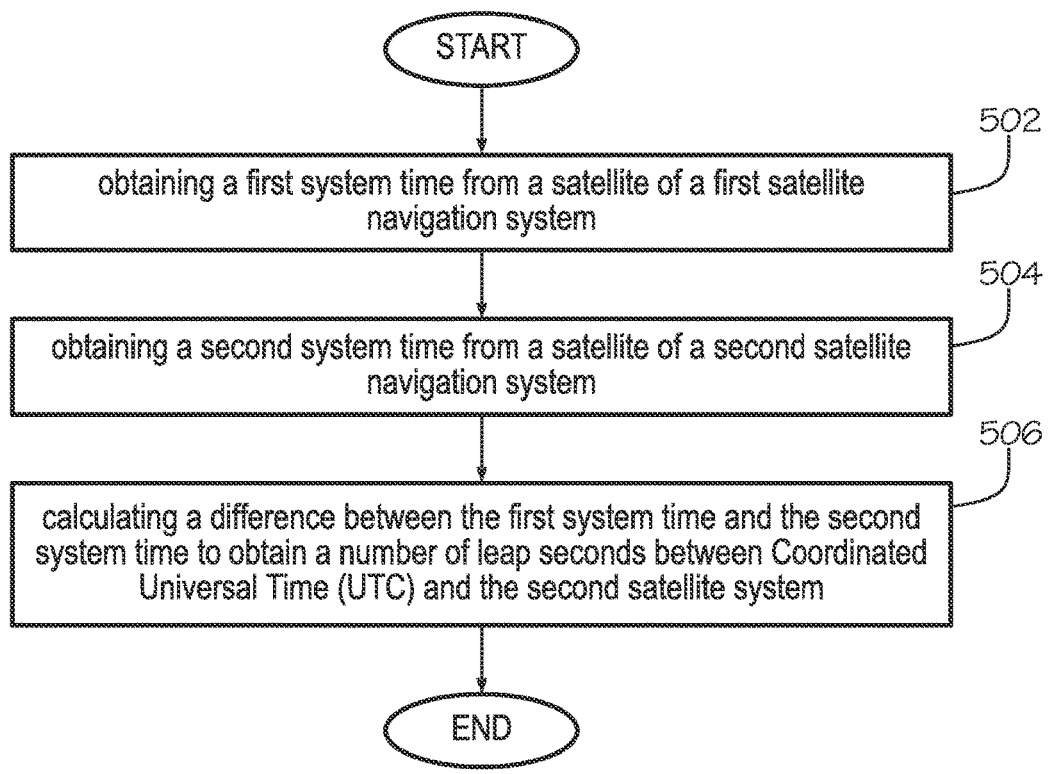
FIG. 5 is a flowchart illustrating a method for satellite communication using a GNSS receiver.

FIG. 5 is a flowchart illustrating a method for satellite communication using the GNSS receiver 102. The GNSS receiver 102, via the antenna 110, tracks at least one signal from the Glonass satellite 106a (at step 502) and at least one signal from the GPS satellite 106b (at step 504), thereby allowing the GNSS receiver 102 to obtain system time information 120, 122 of Glonass and GPS, respectively. The obtained system time information 120, 122 can be stored in the memory 118, e.g., the primary memory.

At step 506, the microcontroller 116 of the GNSS receiver 102, using the executable instructions stored in the memory 118, calculates a difference between a system time provided in the system time information 120 of the Glonass satellite 106a and a system time provided in the system time information 122 of the GPS satellite 106b, using Equation (1):

$$T\text{leap seconds} = GPS\text{receive time} - G\text{lass receive time} \qquad (1)$$

The calculated Tleap_seconds may be rounded to the nearest whole second; uncertainty in the GNSS receiver 102 measurement is relatively small as a result of local time drift between GPS and Glonass system measurements and small orbit time uncertainty. For example, GNSS receiver 102 time drift may be 1 ppm, which results in less than a 100 μsecond drift across a 60 second period.

The calculated, rounded difference (value) represents a number of leap seconds between Glonass and GPS time, and thus a number of leap seconds between UTC and GPS time. The calculated value can be used by the GNSS receiver 102 to adjust/update the GPS time accordingly. The calculated value can be determined within 30 seconds such that the GPS and Glonass satellites 106b and 106a, respectively, can be used in the same position solution.

As the GNSS receiver 102 is able to calculate a leap second offset between UTC and GPS times, the drawbacks associated with the aforementioned leap second change issues can be reduced, if not eliminated. The leap second offset calculation can also be used as a system time check of the GNSS receiver 102.

The aforementioned leap second offset calculation can be kept within an accuracy of <<1 msec by the control algorithm executed by the microcontroller 116. However, the accuracy may diminish to ±10 msecs due to unknown orbit transmit delay, unknown user position, etc.

As long as a data frame time is known, any time position in the frame may be used as a time mark. For example, the aforementioned leap second offset calculation can be determined within 30 seconds (e.g., a time frame of satellite ephemeris data collection); this improves the Carrier-to-Noise (CNo) sensitivity at which the UTC leap second offset can be known, as a full data decode of a frame is not required, only a decode of subframe numbers (and line numbers) and synchronization words.

From the foregoing and with reference to the various figure drawings, those skilled in the art will appreciate that certain modifications can also be made to the present disclosure without departing from the scope of the same. For example, the components of the GNSS receiver 102 can be provided on an SoC. The SoC includes at least one module thereon that in response to being executed by the at least one microcontroller 116 enables the GNSS receiver 102 to perform the method described above with respect to FIG. 5.

While the present disclosure has been particularly shown and described with reference to certain embodiments thereof, it will be understood by those of ordinary skill in the art that various changes in form and details may be made therein without departing from the spirit and scope of the present disclosure.

What is claimed is:

1. A method for satellite communication using a Global Navigation Satellite System (GNSS) receiver, the method comprising:
    obtaining a first system time in a first frame structure from a satellite of a first satellite navigation system, wherein obtaining the first system time includes updating the first system time;
    obtaining a second system time in a second frame structure different from the first frame structure from a satellite of a second satellite navigation system, wherein obtaining the second system time includes updating the second system time; and
    calculating a difference between the first system time and the second system time based on the first frame structure and the second frame structure to obtain a number of leap seconds between Coordinated Universal Time (UTC) and the second satellite system.

2. The method according to claim 1, further comprising rounding the calculated difference to the nearest whole second.

3. The method according to claim 1, wherein calculating the difference between the first system time and the second system time includes subtracting the first system time from the second system time.

4. The method according to claim 1, wherein obtaining the first system time includes updating the first system time at least every 30 seconds.

5. The method according to claim 1, wherein obtaining the second system time includes updating the second system time at least every 6 seconds.

6. The method according to claim 1, wherein the first satellite navigation system is the GLONASS system and the second satellite navigation system is selected from the group consisting of the Global Positioning System (GPS), the Galileo system, and the Beidou system.

7. A Global Navigation Satellite System (GNSS) receiver comprising:
    memory configured to store a first system time in a first frame structure obtained from a satellite of a first satellite navigation system and a second system time in a second frame structure different from the first frame structure obtained from a satellite of a second satellite navigation system, wherein the obtained first system time includes updated first system time, and wherein obtaining the second system time includes updating the second system time; and
    a microcontroller coupled to the memory and configured to calculate a difference between the first system time and the second system time based on the first frame structure and the second frame structure for obtaining a number of leap seconds between Coordinated Universal Time (UTC).

8. The GNSS receiver according to claim 7, wherein the microcontroller is further configured to round the calculated difference to the nearest whole second.

9. The GNSS receiver according to claim 7, wherein the microcontroller calculates the difference between the first system time and the second system time by subtracting the first system time from the second system time.

10. The GNSS receiver according to claim 7, wherein the first system time is updated at least every 30 seconds.

11. The GNSS receiver according to claim 7, wherein the second system time is updated at least every 6 seconds.

12. The GNSS receiver according to claim 7, wherein the first satellite navigation system is the GLONASS system and the second satellite navigation system is selected from the group consisting of the Global Positioning System (GPS), the Galileo system, and the Beidou system.

13. A System on Chip (SoC) having at least one module thereon that in response to being executed by at least one microcontroller in a Global Navigation Satellite System (GNSS) receiver enables the GNSS receiver to perform the method comprising:
    obtaining a first system time in a first frame structure from a satellite of a first satellite navigation system, wherein obtaining the first system time includes updating the first system time;
    obtaining a second system time in a second frame structure different from the first frame structure from a satellite of a second satellite navigation system, wherein obtaining the second system time includes updating the second system time; and
    calculating a difference between the first system time and the second system time based on the first frame structure and the second frame structure to obtain a number of leap seconds between Coordinated Universal Time (UTC) and the second satellite system.

14. The SoC according to claim 13, further comprising rounding the calculated difference to the nearest whole second.

15. The SoC according to claim 13, wherein calculating the difference between the first system time and the second system time includes subtracting the first system time from the second system time.

16. The SoC according to claim 13, wherein obtaining the first system time includes updating the first system time at least every 30 seconds.

17. The SoC according to claim 13, wherein obtaining the second system time includes updating the second system time at least every 6 seconds.

18. The SoC according to claim 13, wherein the first satellite navigation system is the GLONASS system and the second satellite navigation system is selected from the group consisting of the Global Positioning System (GPS), the Galileo system, and the Beidou system.

* * * * *